United States Patent [19]

Espelage et al.

[11] 4,298,831
[45] Nov. 3, 1981

[54] METHOD AND APPARATUS FOR OPERATING A PLURALITY OF PARALLEL COUPLED, ARBITRARILY LOADED INDUCTION MACHINES FROM A SINGLE CONTROLLED CURRENT INVERTER

[75] Inventors: Paul M. Espelage, Salem, Va.; John D. D'Atre, Ballston Lake, N.Y.

[73] Assignee: General Electric Company, Schenectady, N.Y.

[21] Appl. No.: 132,783

[22] Filed: Mar. 24, 1980

[51] Int. Cl.³ .......................... H02P 1/54; H02P 5/46; H02P 1/24; H02P 5/28

[52] U.S. Cl. ..................................... 318/112; 318/34; 318/729; 318/808; 318/805

[58] Field of Search ....................... 318/44, 52, 77, 78, 318/80, 82, 85, 98, 112, 798–803, 807–812, 42, 34, 729; 363/37; 323/207

[56] References Cited

U.S. PATENT DOCUMENTS

| | | | |
|---|---|---|---|
| 3,911,340 | 10/1975 | Plunkett | 318/802 |
| 3,916,275 | 10/1975 | Plunkett | 318/802 |
| 4,088,934 | 5/1978 | D'Atre et al. | 318/808 |
| 4,135,118 | 1/1979 | Seeger et al. | 318/85 |

OTHER PUBLICATIONS

Article entitled "A Current Source Converter for Multi-Motor Applications", by Stanley Mann, 1975, IEEE-IAS Annual Proceedings, pp. 980–983.

*Primary Examiner*—James R. Scott
*Assistant Examiner*—John B. Conklin
*Attorney, Agent, or Firm*—William H. Steinberg; James C. Davis, Jr.; Paul R. Webb, II

[57] ABSTRACT

A plurality of arbitrarily loaded induction machines are operated from a single, controlled current inverter by regulating the amplitude of inverter output current in response to the average of the individual induction machine phase angles, the machine phase angle being the phase relationship magnitude between machine air gap flux and current, and by regulating the frequency of inverter output current in response to the average of the individual induction machine phase angle and the slip frequency of the most heavily loaded induction machine. The most heavily loaded induction machine is thus assured of having sufficient flux, thereby greatly reducing the possibility of machine pull-out and resultant inverter instability.

14 Claims, 6 Drawing Figures

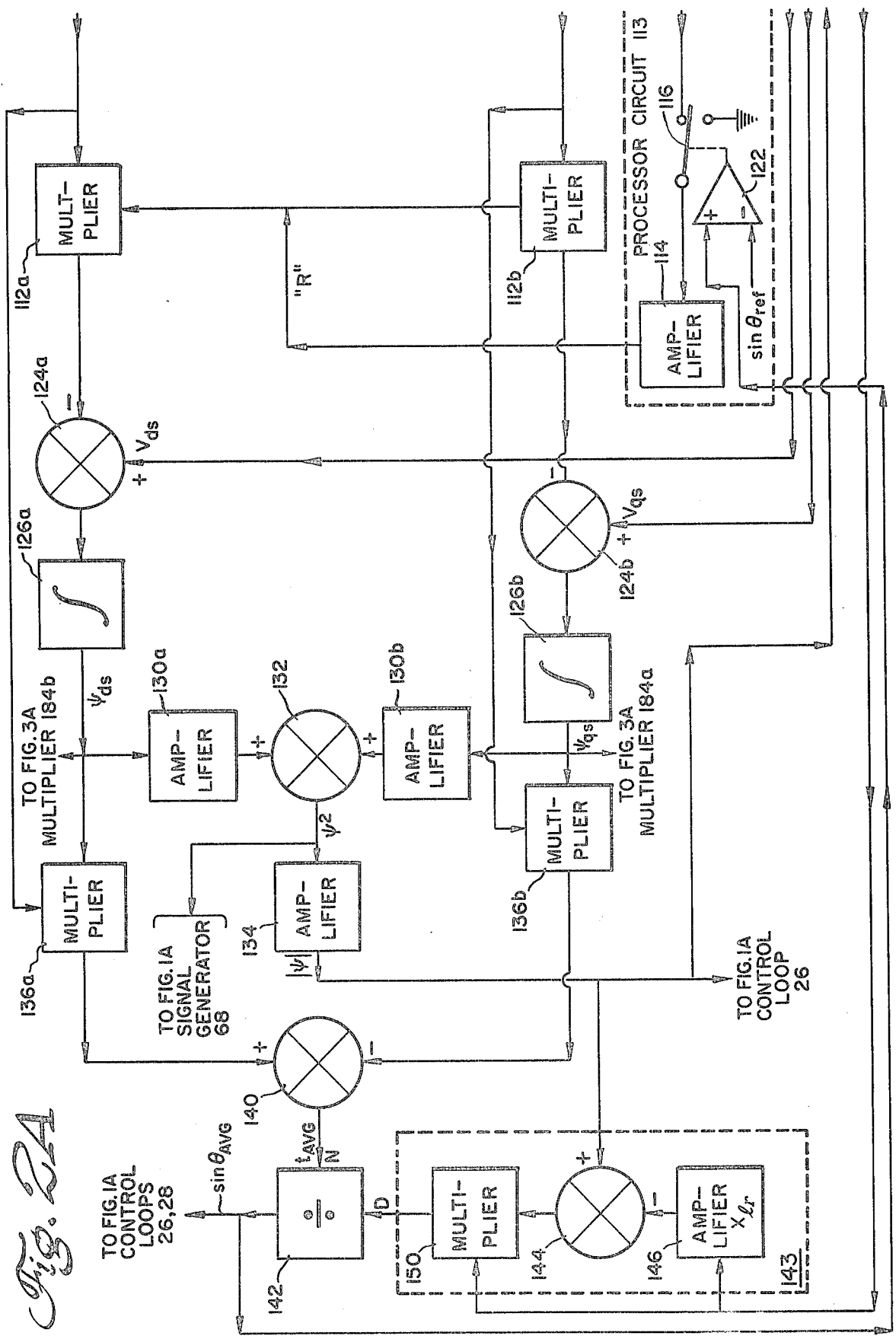

METHOD AND APPARATUS FOR OPERATING A PLURALITY OF PARALLEL COUPLED, ARBITRARILY LOADED INDUCTION MACHINES FROM A SINGLE CONTROLLED CURRENT INVERTER

BACKGROUND OF THE INVENTION

This invention relates to controlled current inverter-induction machine drive systems, and more specifically to a method, and associated apparatus, for operating a plurality of arbitrarily loaded induction machines from a single, controlled current inverter.

The ruggedness and reliability of the induction machine has led to its widespread use in many industrial applications, including large electric and diesel-electric excavating equipment. Usually, in such industrial applications, the induction machine is energized from a single-frequency potential source, such as a phase controlled rectifier for example, through an inverter comprised of a plurality of pairs of switching devices, with switching devices of each pair coupled in series-aiding fashion and each of the pairs of serially connected switching devices coupled across the single frequency potential source. By regulating the duration and frequency of inverter switching device conduction, the amplitude and frequency, respectively, of inverter output current and hence, induction machine torque and speed, respectively, can be controlled accordingly.

Inverters employed to condition induction machine voltage in the manner described above are commonly designated either as controlled current source inverters or controlled voltage source inverters depending on whether inverter input current or inverter input voltage, respectively, is ultimately controlled responsive to operator commands. The controlled current source inverter, abbreviated CCI, is particularly well suited for energizing alternating current machines constrained to provide constant torque over a fixed frequency range. In addition, in comparison with controlled voltage source inverters, the controlled current source inverter is less complex and less expensive to manufacture, thus making the controlled current source inverter an attractive alternative to conventional controlled voltage source inverters for many applications.

For the sake of economy, it is often desirable to operate several induction machines from a single inverter. While controlled-voltage source inverters are capable of operating several induction machines without difficulty, the same is not true of controlled-current source inverters. If a plurality of machines are operated from a controlled-current source inverter, and the machines are not equally geared, equally loaded or coupled to a common shaft, then there is a great probability that the most heavily loaded machine will quickly become under-excited and pull out. Should one of the induction machines become under excited and pull out, inverter instability would likely result, possibly causing damage to the inverter.

One proposed solution to the problem of operating a plurality of arbitrarily loaded induction machines from a controlled current source inverter has been to substitute the combination of a DC-DC chopper, energized from a DC source, and a voltage regulator, in place of the conventional alternating current-to-direct current phase controlled rectifier. The voltage regulator controls the chopping frequency of the DC-DC chopper, causing it to chop at a relatively high rate so that the combined chopper-voltage regulator-inverter circuit appears electrically the same to the induction machine as a conventional controlled voltage source inverter. However, to achieve satisfactory dynamic machine drive system performance, the DC-DC chopper must be capable of operation at relatively high frequencies, thus requiring that the chopper circuit be fabricated of costly, high current, switching devices.

In contrast, the present invention concerns a method and apparatus, compatible with conventional controlled current source inverters, for operating a plurality of parallel-coupled, arbitrarily loaded induction machines from a single controlled current source inverter.

It is an object of the present invention to provide a method and apparatus for operating a plurality or arbitrarily loaded induction machines from a single controlled current inverter source which is compatible with present day inverters.

It is another object of the present invention to provide a method and apparatus for operating a plurality of arbitrarily loaded induction machines so that machine pull-out and resultant inverter instability are avoided.

BRIEF SUMMARY OF THE INVENTION

Briefly, in accordance with the preferred embodiment of the invention, an improved control apparatus for operating a plurality of arbitrarily loaded induction machines from a single controlled current inverter comprises a signal generator circuit coupled to the inverter and to each of the plurality of induction machines. The signal generator circuit generates a first signal varying in accordance with the average machine phase angle, the average machine phase angle being $(1/N)^{th}$ of the magnitude of the sum of each machine phase angle where N is the number of machines. The signal generator circuit also produces a second signal varying in accordance with the slip frequency of the most heavily loaded machine. The first output signal produced by the signal generator circuit is supplied to a first control loop which regulates the amplitude of inverter output current by feedback control in response to the average machine phase angle. A second control loop, coupled to the inverter, and supplied with both the first and second signal generator circuit output signals, regulates the inverter output current frequency by feedback control in response to the average machine phase angle and the slip frequency of the most heavily loaded induction machine. Regulating inverter output current amplitude and frequency in this manner assures that the most heavily loaded induction machine has sufficient flux thereby reducing the likelihood of machine pull-out, and hence, resultant inverter instability.

BRIEF DESCRIPTION OF THE DRAWINGS.

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

FIGS. 2A and 2B are a block diagram of the parameter signal generator comprising a portion of the control apparatus of FIG. 1.

DETAILED DESCRIPTION OF THE PREFERRED EMBODIMENT

Figure 1A:
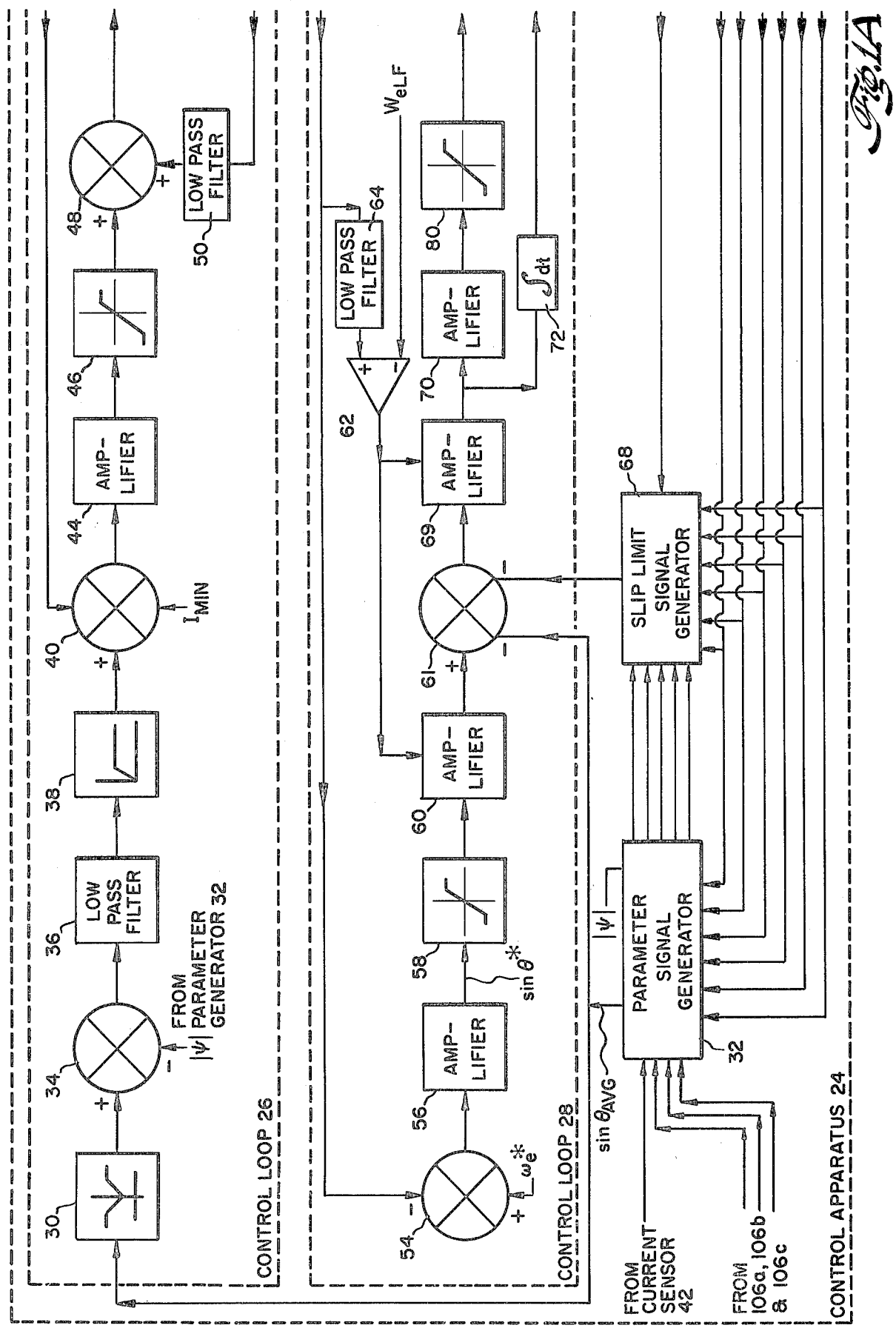
FIGS. 1A and 1B are a block diagram of a controlled current inverter-induction machine drive system coupled to the control apparatus of the present invention.
Figure 1B:
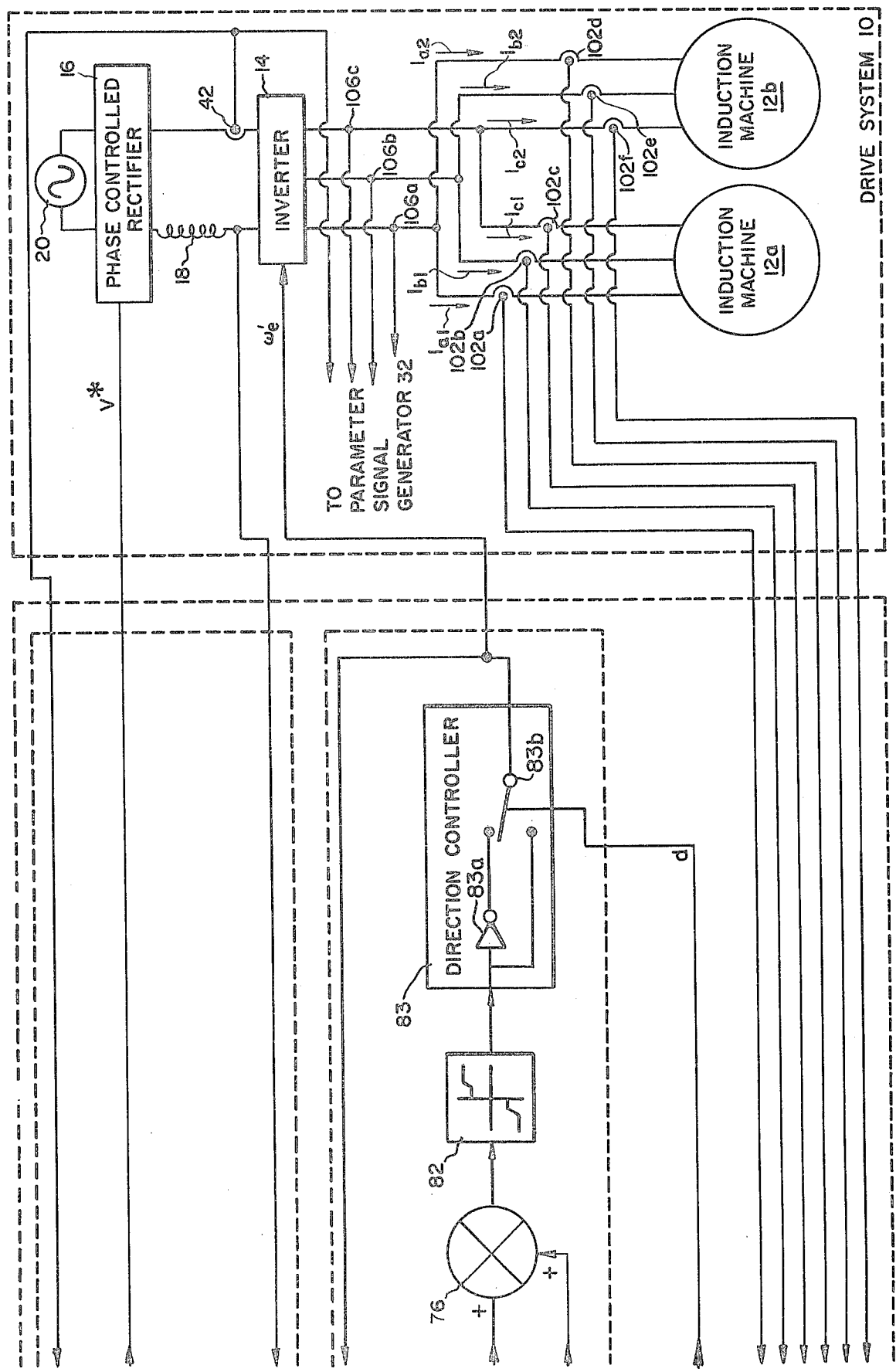

FIGS. 1A and 1B illustrate a multi-motor induction machine drive system 10 comprising a pair of three phase induction machines 12a and 12b. Induction machines 12a and 12b are coupled in parallel across the output of a three phase inverter 14. Inverter 14 typically comprises a conventional bridge inverter such as is described in the text *Principles of Inverter Circuits* by Bedford and Hoft (Wiley & Sons, 1964) and is configured of three pairs of controlled switching devices (not shown), the devices of each pair coupled in series aiding fashion, with each switching device being either a thyristor or high current transistor. When supplied with direct current from a phase controlled rectifier 16 coupled in series with a filter inductance 18, inverter 14 supplies each of machines 12a and 12b with three phase alternating currents. Phase controlled rectifier 16 is energized from a commercial alternating current source 20.

Control of the speed and torque of inverter-induction machine drive system 10 is achieved by regulating the frequency and amplitude of inverter output current. Control of inverter output current amplitude is achieved by adjusting the amplitude of output voltage produced by phase controlled rectifier 16 in accordance with a voltage command signal V* supplied by a control apparatus 24 (described below). Inverter frequency is regulated by varying the conduction frequency of inverter switching devices in conventional fashion in accordance with a frequency command signal $\omega_e$ supplied by the control apparatus.

As earlier indicated, various control apparatus for regulating inverter-induction machine drive system torque and speed in accordance with inverter current to achieve inverter-drive system stability have been proposed. While such control apparatus have proven satisfactory for controlling either a single induction machine drive system, or a multiple machine induction machine drive system where the induction machines as equally geared, equally loaded, or coupled to a common shaft, such prior art control apparatus do not provide satisfactory control of a multiple induction machine-inverter drive system, such as inverter drive system 10, in which each of the induction machines is arbitrarily loaded. Use of prior art control apparatus to operate a plurality of arbitrarily loaded induction machines from a single controlled current inverter source would likely incur the difficulty that the most heavily loaded induction machine would quickly become under excited and thus not have sufficient flux, causing the machine to pull-out and possibly even resulting in inverter instability.

To alleviate all of the difficulties incurred with the use of prior art control apparatus, inverter drive system 10 is regulated in accordance with inverter current by control apparatus 24. Control apparatus 24 includes first and second control loops 26 and 28, respectively. Control loop 26 regulates inverter output current amplitude and hence machine flux by regulating the output voltage amplitude of phase controlled rectifier 16 by feedback control in response to the average of the individual machine phase angles. Control loop 26 comprises a flux processor 30 which is supplied from a parameter signal generator 32 (described in greater detail with respect to FIG. 2) with a signal sin $\theta_{AVG}$ varying in accordance with the average of the induction machine phase angles. Flux processor 30 preferably comprises a limiter which amplitude limits the input signal supplied thereto. As the sin $\theta_{AVG}$ signal supplied to flux processor 30 varies in accordance with the desired machine air gap flux for the particular load condition, the output signal provided by flux processor 30 represents desired machine flux. By limiting the sin $\theta_{AVG}$ signal supplied thereto, flux processor 30 prevents commanded machine flux (as represented by the magnitude of signal sin $\theta_{AVG}$) from exceeding rated machine flux.

The output signal produced by flux processor 30 is supplied to the noninvert input of a summing amplifier 34. Summing amplifier 34 is supplied at the invert input from parameter signal generator 32 with a signal $|\psi|$ varying in accordance with the absolute magnitude of actual average stator flux produced by machines 12a and 12b and, in accordance with the difference in magnitude between signals supplied to the invert and noninvert summing amplifier inputs, the summing amplifier produces a flux error output signal. The flux error signal produced by summing amplifier 34 is filtered by a low pass filter 36 to reduce noise and is limited by an amplitude limiter 38 to produce the current command signal I* supplied to the first noninvert input of a three input summing amplifier 40. By amplitude limiting the input signal supplied to summing amplifier 40, limiter 38 assures that commanded current does not exceed the maximum permissible magnitude of inverter current. Summing amplifier 40 is supplied at the second noninvert input from an external circuit (not shown) with a signal I*$_{min}$ varying in accordance with the desired minimum inverter output current amplitude, as determined by operator command. The invert input to summing amplifier 40 is coupled to the output of a current sensor 42 connected in series with phase controlled rectifier 16 and inverter 14 of drive system 10. Summing amplifier 40 supplies an output signal varying in accordance with the magnitude of the sum of input signals supplied to its first and noninvert second inputs less the input signal magnitude at its invert input, to the input of a high amplifier 44. Amplifier 44 is coupled at the output through limiter 46 to the first noninvert input of a third summing amplifier 48. By limiting the output signal of amplifier 44, which varies in amplitude in accordance with desired inverter output, limiter 46 prevents inverter output current from increasing too rapidly. The second noninvert input to summing amplifier 48 is supplied with inverter input voltage from a low pass filter 50 coupled to phase controlled rectifier 16. In accordance with the sum of the signals supplied to the first and second summing amplifier inputs, summing amplifier 48 produces the voltage command signal, V*, supplied to phase controlled rectifier 16. Phase controlled rectifier 16 is responsive to voltage command signal V* and varies the inverter input current amplitude in accordance therewith.

During control loop 26 operation, summing amplifier 34 produces a flux error signal proportional to the difference in magnitude between desired machine flux, as determined from the average of the machine phase angles, and actual machine flux. The flux error signal, filtered by filter 36 and limited by limiter 38, respectively, is combined at summing amplifier 40 with a minimum desired current signal and a signal proportional in magnitude with actual machine current to produce a current error signal. The current error signal is combined at summing amplifier 48 with inverter input voltage to produce the phase controlled rectifier voltage command signal V*. Configured as described above, control loop 26 advantageously regulates inverter output current amplitude by feedback control of phase controlled rectifier 16 output voltage amplitude in response to the average induction machine phase angle. This assures that inverter output current will be of sufficient amplitude to excite both of induction machines 12a and 12b.

Control loop 28 regulates the frequency of inverter output current and hence, induction machine speed and comprises a summing amplifier 54 which is supplied at the noninvert input from an external circuit (not shown) with an operator-varied inverter frequency control signal $\omega_e^*$ representing desired machine frequency. The invert input to summing amplifier 54 is coupled to the frequency command signal input of inverter 14 so that summing amplifier 54 is supplied with the resultant inverter frequency control signal $\omega_e'$ which varies in accordance with actual machine frequency. In accordance with the difference in magnitude between signals supplied to the invert and noninvert summing amplifier inputs, summing amplifier 54 provides a frequency error signal to a high gain amplifier 56. Amplifier 56 supplies an phase angle command signal sin $\theta^*$, proportional to the frequency error signal produced by summing amplifier 54, to a limiter 58 which limits the phase angle command signal produced by limiter 56 to prevent a machine phase angle in excess of the maximum allowable machine phase angle.

A first adjustable gain amplifier network 60, coupled between the output of phase angle processor 58 and the noninvert input of a summing amplifier 61, scales the magnitude of sin $\theta^*$ in accordance with the output signal produced by a comparator 62. Comparator 62 is supplied at the noninvert input through low pass filter 64 with $\omega_e$, the inverter frequency command signal. Low pass filter 64 is provided to filter out any extraneous noise. Comparator 62 is supplied at the invert input from an external source with a signal $\omega_{eLF}$. Signal $\omega_{eLF}$ is equal in magnitude to $\omega_e$ when machine frequency is low, that is, when $\omega$, the machine frequency is equal to or less than 7 Hertz. At frequencies less than 7 Hertz, comparator 62 produces a null level output signal, causing adjustable gain amplifier 60 to scale the magnitude of sin $\theta^*$ by a first factor, typically 1.2. At machine frequencies greater than 7 Hertz, when the output signal of comparator 62 is of unity amplitude, adjustable gain amplifier 60 scales sin $\theta^*$ by a second factor, typically 1.0. In this manner, the machine phase angle command signal is compensated for increased ripple occurring in machine current at high frequencies.

The output signal generated by adjustable gain amplifier 60 is supplied to the noninvert input of a three input summing amplifier 61. Summing amplifier 61 is supplied at the first invert input from signal generator 32 with the signal sin $\theta_{AVG}$. The second invert summing amplifier input is supplied from a slip limit signal generator 68 (described in greater detail with respect to FIGS. 3A and 3B) with a signal varying in accordance with the slip frequency of the most heavily loaded induction machine. Summing amplifier 61 produces an output signal, varying in accordance with the difference between the input signal magnitude at the noninvert summing amplifier input and the combined magnitude of signals supplied to the first and second invert inputs, which is supplied to the input of a second adjustable gain amplifier 69. Adjustable gain amplifier 69, configured identically to adjustable gain amplifier 60, scales the magnitude of the input signal supplied thereto in accordance with output signal magnitude of comparator 62. During intervals when inverter output frequency is less than 7 Hertz, adjustable gain amplifier 69 scales the magnitude of the input signal supplied from summing amplifier 61 by a first factor, preferably 0.45 while during intervals when inverter output frequency is greater than 7 Hertz, adjustable gain network 68 scales the magnitude of the input signal supplied by the summing amplifier by a second factor, preferably 3.0. By decreasing the output signal magnitude of summing amplifier 61 at low frequencies, amplifier 69 compensates for extraneous noise.

The output signal produced by adjustable gain amplifier 69 is supplied to both an amplifier 70, which increases signal bandwidth, and to an integrator 72. Integrator 72 produces an output signal, proportional to the integral of the input signal supplied thereto, which in turn is supplied to the first noninvert input of a two input summing amplifier 76. The second noninvert input of summing amplifier 76 is supplied with the output signal from a limiter 80 coupled between the output of gain network 70 and the second noninvert input of the summing amplifier. By limiting the output signal magnitude of amplifer 70 limiter 80 limits the rate at which inverter frequency can increase. Summing amplifier 76 produces a frequency command signal in accordance with the sum of the signals supplied to the first and second summing amplifier inputs. Those skilled in the art will recognize that gain network 70, integrator 72, summing amplifier 76, and limiter 80 operate in concert as an amplifier having an integral plus proportional transfer characteristic. The frequency command signal $\omega_e$ produced by summing amplifier 76 is limited by minimum limiter 82, typically a 1 Hertz limiter, to limit the commanded machine frequency before being supplied to a direction controller 83. Direction controller 83, which supplies inverter 14 with frequency control signal $\omega'_e$ varying in magnitude in accordance with the output signal magnitude of limiter 82, is typically configured of a polarity inverter 83a shunted by an analog switch 83b which is responsive both to a direction signal d, whose amplitude is either positive or negative when forward or reverse machine rotation, respectively, is commanded by user personnel, and to the frequency command signal $\omega_e$. Depending on whether the actual direction of machine rotation coincides with, or is opposite to, the commanded direction of rotation, as determined by the difference in polarity between the frequency command signal $\omega_e$ and the direction signal d, direction controller 83 either reverses the polarity of the frequency command signal or allows it to pass therethrough unaltered, respectively, to inverter 14.

During control loop 28 operation, summing amplifier 58 produces a frequency error signal proportional to the difference in magnitude between desired and actual machine frequency. The frequency error signal, amplified by amplifiers 56 and 60, respectively, and limited by limiter 58, is combined at summing amplifier 61 with signals proportional to the slip of the most heavily loaded machine and the average machine phase angle. The output signal of summing amplifier 61 is scaled by adjustable gain 69 to produce a machine phase angle command signal which is further scaled and integrated by gain network 70 and integrator 72, respectively, to produce the inverter frequency control signal $\omega_e'$ supplied to inverter 14.

Configured as described above, control loop 28 advantageously regulates inverter output frequency and hence, machine speed by feedback control responsive to the average induction machine phase angle relationship magnitude and the slip frequency of the most heavily loaded induction machine. Regulating inverter frequency responsive to the slip frequency of the most heavily loaded machine assures that the most heavily loaded machine has sufficient flux to prevent machine pullout and hence resultant inverter instability. Although this may cause the more lightly loaded induction machine to become over-excited, the inverter nevertheless remains stable.

Figure 2B:
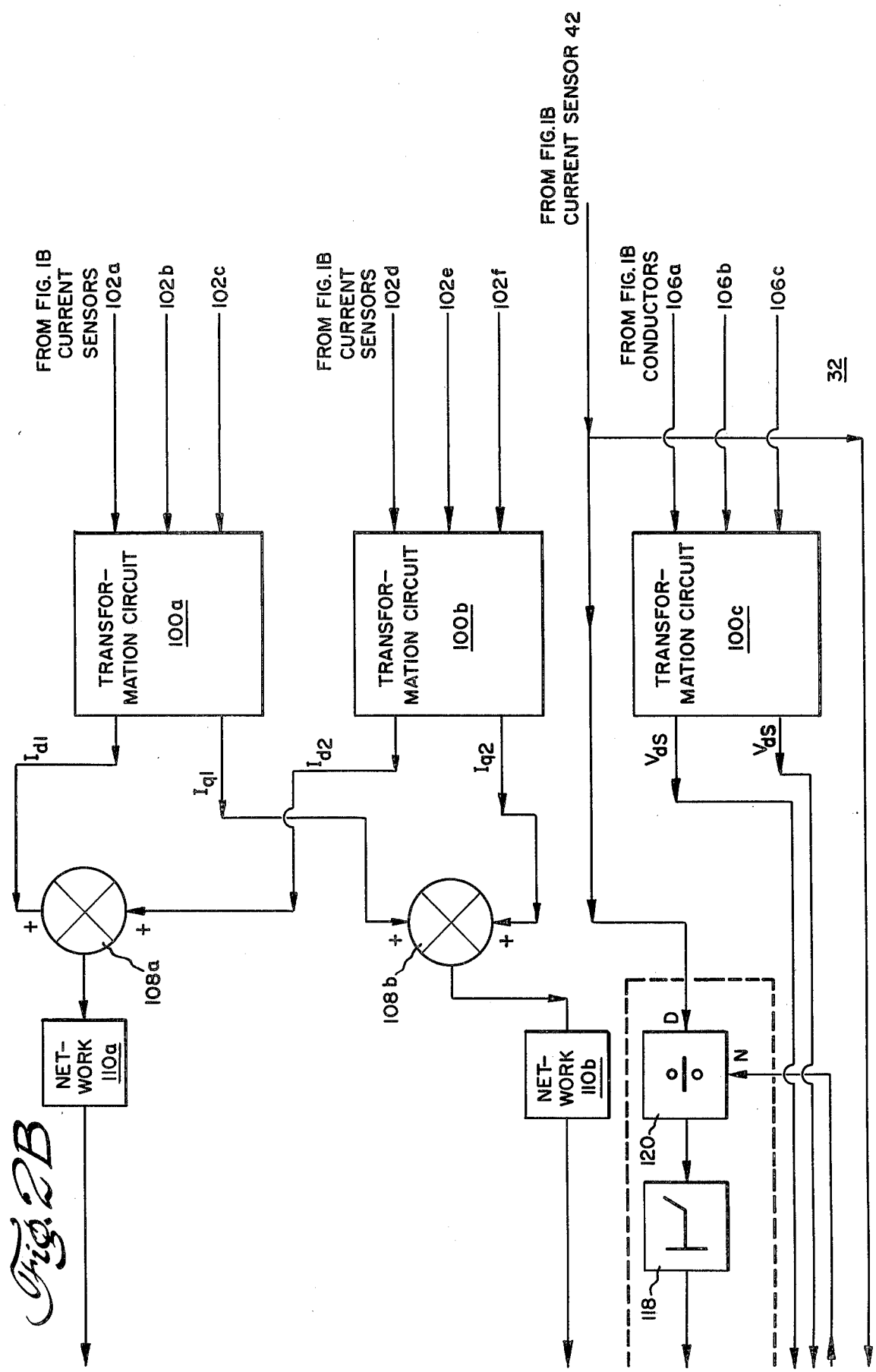

Parameter signal generator 32, which supplies control loops 26 and 28 with the signal $\sin \theta_{AVG}$ and control loop 26 with the signal $|\psi|$, is illustrated in block form in FIGS. 2A and 2B and comprises 3 three-to-two axes transformation circuits 100a, 100b and 100c, respectively. Transformation circuit 100a is coupled at each of its three inputs to one of current sensors 102a, 102b and 102c, respectively, of FIGS. 1A and 1B, each sensor being coupled in series with one of the three phases, respectively, of induction machine 12a and inverter 14 shown in FIGS. 1A and 1B. In accordance with output signals produced by current sensors 102a, 102b and 102c, which vary in accordance with induction machine 12a phase currents $I_{a1}$, $I_{b1}$, and $I_{c1}$, respectively, transformation circuit 100a of FIGS. 2A and 2B produces a pair of output signals, $I_{d1}$ and $I_{q1}$, varying in accordance with the direct and quadrature axes components, respectively, of induction machine 12a stator current. Transformation circuit 100b is coupled at each of its three inputs to one of current sensors 102d, 102e and 102f, respectively, of FIGS. 1A and 1B, each sensor coupled in series with one of the three phases, respectively, of induction machine 12b and inverter 14 of FIGS. 1A and 1B. In accordance with the output signals produced by current sensors 102d, 102e and 102f, which vary in accordance with induction machine 12b stator currents $I_{a2}$, $I_{b2}$ and $I_{c2}$, respectively, transformation circuit 100b of FIG. 2 produces a pair of output signals $I_{d2}$ and $I_{q2}$, which vary in accordance with the direct and quadrature axis components, respectively, of induction machine 12b stator current. Transformation circuit 100c is supplied from inverter 14 shown in FIGS. 1A and 1B via conductors 106a, 106b and 106c with inverter output voltages $V_a$, $V_b$ and $V_c$, respectively, and in accordance therewith transformation circuit 100c produces a pair of output signals $V_{qs}$ and $V_{ds}$, which vary in accordance with the quadrature and direct components, respectively, of inverter output voltage.

A first summing amplifier 108a is coupled at its first and second noninvert inputs to the first output of each of transformation circuits 100a and 100b, respectively, and, in accordance with the sum signals $I_{d1}$ and $I_{d2}$ supplied to its first and second noninvert summing amplifier inputs, respectively, summing amplifier 108a produces an output signal varying in accordance with the direct axis component of the total stator current drawn by machines 12a and 12b. The output signal produced by summing amplifier 108a is attenuated by an attenuation network 110a preferably having an attenuation factor of 0.5, to provide the first input of a first multiplier 112a a signal varying in accordance with the direct axis component of the average of the induction machine stator currents.

A second summing amplifier 108b is coupled at its first and second noninvert inputs to the second output of each of transformation circuits 100a and 100b, respectively, and in accordance with the sum of signals $I_{q1}$ and $I_{q2}$ supplied to its first and second noninvert summing amplifier inputs, respectively, summing amplifier 108b produces an output signal varying in accordance with the quadrature axis component of the total stator currents drawn by both machines. The output signal produced by summing amplifier 108b is attenuated by an attenuation network 110b, typically having an attenuation factor of 0.5, to provide the first input of a second multiplier 112b with a signal varying in accordance with the machine quadrature axes component of the average of induction machine stator currents.

Each of multipliers 112a and 112b is supplied at its respective second input from a processor circuit 113 with a signal "R". Processor circuit 113 comprises an amplifier 114 coupled at its input by an analog switch 116 to the output of a limiter 118 or to circuit ground. Limiter 118 is supplied at its input with the output signal of a divider 120 supplied at the numerator input N with the signal $|\psi|$ varying in accordance with the average machine stator flux and at the denominator D input with the output signal produced by current sensor 42 of FIG. 1.

Switch 116 is responsive to the output signal amplitude of a comparator 122 supplied at its invert input with the signal $\sin \theta_{AVG}$, varying in accordance with the average machine phase angle relationship magnitude, and at its noninvert input with a fixed-value reference signal $\sin \theta_{ref}$, whose magnitude is directly related to the average induction machine phase angle relationship magnitude during intervals of other than heavy machine load conditions. During intervals of heavy machine load conditions when $\sin \theta_{ref}$ is less than $\sin \theta_{AVG}$, switch 116 couples the input of amplifier 114 to limiter 118, causing amplifier 114 to be supplied with a signal varying in accordance with the actual flux per ampere produced by machines 12a and 12b of FIG. 1. The output signal of limiter 118, being proportional to the average machine flux per ampere, and thus, proportional to machine stator resistance, is scaled by amplifier 114, and accordingly, amplifier 114 supplies each of multiplier 112a and 112b with a signal varying in accordance with effective machine stator resistance, thereby causing each of multipliers 112a and 112b, respectively, to produce a signal varying in accordance with the direct and quadrature axis components, respectively, of the average induction machine stator resistance voltage drop. At intervals other than during conditions of heavy machine loads, which 116 couples the input of amplifier 114 to circuit ground, causing each of multipliers 112a and 112b to be supplied at its second input with null level output signals.

Each of multipliers 112a and 112b, respectively, is coupled at its output to the invert input of one of summing amplifiers 124a and 124b, respectively. Summing amplifier 124a is supplied at its noninvert input from transformation circuit 100c with the signal $V_{ds}$ and, in accordance with the difference in magnitude between signals supplied to its invert and noninvert inputs, summing amplifier 124a supplies an output signal to integrator 126a which integrates the input signal supplied thereto to produce an output signal $\psi_{ds}$ varying in amplitude in accordance with the direct axis component of the average of the stator flux produced by machines 12a and 12b of FIG. 1. Summing amplifier 124b is supplied at its noninvert input from transformation circuit 100c with signal $V_{qs}$ and, in accordance with the difference in magnitude between signals supplied to its invert and noninvert inputs, summing amplifier 124b supplies an output signal to integrator 126b which integrates the input signal supplied thereto to produce an output signal $\psi_{qs}$ varying in amplitude in accordance with the quadrature axis component of the average of the stator fluxes produced by the induction machines.

Flux signal $\psi_{ds}$ and $\psi_{qs}$ produced by integrators 126a and 126b, respectively, are compensated for machine load conditions by processor circuit 113 to account for the large influence of machine stator resistance on actual machine stator flux during intervals of heavy machine load conditions. During such intervals of heavy machine load conditions, when switch 116 couples amplifier 114 to limiter 118, flux signals $\psi_{ds}$ and $\psi_{qs}$ are responsive to the effective machine stator resistance. At intervals other than during heavy machine load conditions, when switch 116 couples the input of amplifier 114 to ground, flux signals $\psi_{ds}$ and $\psi_{qs}$ are responsive only to signals $V_{ds}$ and $V_{qs}$, respectively, which is consistent with the phenomenon that during intervals of light machine load conditions, machine quadrature and direct axis stator voltage components are approximately equal in magnitude to the nominally true quadrature and direct axis components, respectively, of machine stator flux.

The output signal produced by integrator 126a is supplied to a squaring amplifier 130a and likewise, the output signal produced by integrator 126b is supplied to squaring amplifier 130b. Squaring amplifiers 130a and 130b each produce an output signal varying directly with the square of the magnitude of the input signal supplied thereto. The output signals produced by amplifiers 130a and 130b are supplied to the first and second noninvert inputs, respectively, of a summing amplifier 132, which produces an output signal varying in accordance with the square of the average induction machine air gap fluxes. Signal $\psi^2$ is supplied to square root amplifier 134 which produces an output signal $|\psi|$ varying in accordance with the square root of the input signal magnitudes. Signal $|\psi|$ is supplied to control loop 26 of FIGS. 1A and 1B and to the numerator input N of divider 120.

Each of integrators 126a and 126b, respectively, is also coupled at the output to the first input of one of multipliers 136a and 136b, respectively. Multiplier 136a is supplied at the second input with the output signal produced by attenuation network 110a and, in accordance with the product of the magnitude of signals supplied to the first and second multiplier inputs, multiplier 136 produces an output signal varying in accordance with the expression $(I_{qsAVG}\psi_{dsAVG})$ where $I_{qsAVG}$ represents the quadrature axis component of the average induction machine stator current and $_{dsAVG}$ represents the direct axis component of the average of induction machine stator flux. Multiplier 136b is supplied at the second input with the output signal produced by attenuation network 110b and, in accordance with the product of the magnitude of signals supplied to the first and second multiplier inputs, multiplier 136b produces an output signal varying in accordance with the expression $(I_{dsAVG}\psi_{qsAVG})$ where $I_{dsAVG}$ represents the direct axis component of the average of machine stator current and $\psi_{qsAVG}$ represents the quadrature axis component of the average induction machine stator flux. The output signals produced by multipliers 136a and 136b are supplied to the noninvert and invert inputs, respectively, of a summing amplifier 140. In accordance with the difference in magnitude between signals supplied to its invert and noninvert inputs, summing amplifier 140 produces an output signal $t_{AVG}$ varying in accordance with the average induction machine torque $T_{AVG}$.

The signal $t_{AVG}$ produced by summing amplifier 140 is supplied to the numerator input N of a divider 142 which produces an output signal proportional to the ratio magnitude of the numerator input signal to the denominator input signal. Divider 142 is supplied at the denominator input D from a multiplication circuit 143 with a signal varying in accordance with the magnitude of the product of the average induction machine stator flux $\psi_{AVG}$ and the average induction machine stator current $I_{AVG}$. From the relationship $$\text{SIN } \theta_{AVG} \alpha T_{AVG}/(I_{AVG}\psi_{AVG})$$

it can easily be seen that the output signal produced by divider 142, varying in accordance with the magnitude ratio of signals supplied to the divider numerator and denominator inputs, varies directly with SIN $\theta_{AVG}$, the average machine phase angle relationship magnitude.

Multiplication circuit 143 comprises a summing amplifier 144 which is supplied at its noninvert input from square root amplifier 134 with the signal $\psi$. An amplifier 146, having gain proportional to $X_{lr}$, the average induction machine leakage reactance is coupled at its input to current sensor 42 of FIGS. 1A and 1B, and provides a signal varying in accordance with the expression $X_{lr}I_{DC}$ where $I_{DC}$ is the link current supplied to inverter 14, to the invert input of summing amplifier 144. In accordance with the difference in magnitude between signals supplied to the invert and noninvert inputs, summing amplifier 144 produces an output signal, varying in accordance with the expression $\psi_{AVG} - X_{lr}I_{DC}$), which is supplied to the first input of a multiplier 150. The second input of multiplier 150 is supplied with the output signal produced by current sensor 42 of FIGS. 1A and 1B. Multiplier 150 produces an output signal varying in accordance with the magnitude product of signals supplied to the first and second inputs, and thus the multiplier output signal is proportional to the expression $(I_{DC}\psi_{AVG} - I_{DC}^2X_{lr})$. Recognizing that $I_{DC}$ varies directly with $I_{AVG}$, the average of induction machine stator current, it can easily be seen that the output signal magnitude of multiplier 150 varies in accordance with the magnitude product of the average induction machine stator flux and the average of induction machine stator currents. By decreasing first input signal magnitude to multiplier 150 by subtracting the magnitude of $(X_{lr}I_{DC}^2)$, the multiplier output signal may advantageously be made monotonic. A further, more detailed discussion of circuits, which process induction machine stator currents and voltages to obtain an induction of the machine phase angle relationship magnitude may be found in U.S. Pat. No. 4,088,934 issued to Plunkett, D'Atre and Lipo on May 9, 1979 and assigned to the present assignee.

Figure 3A:
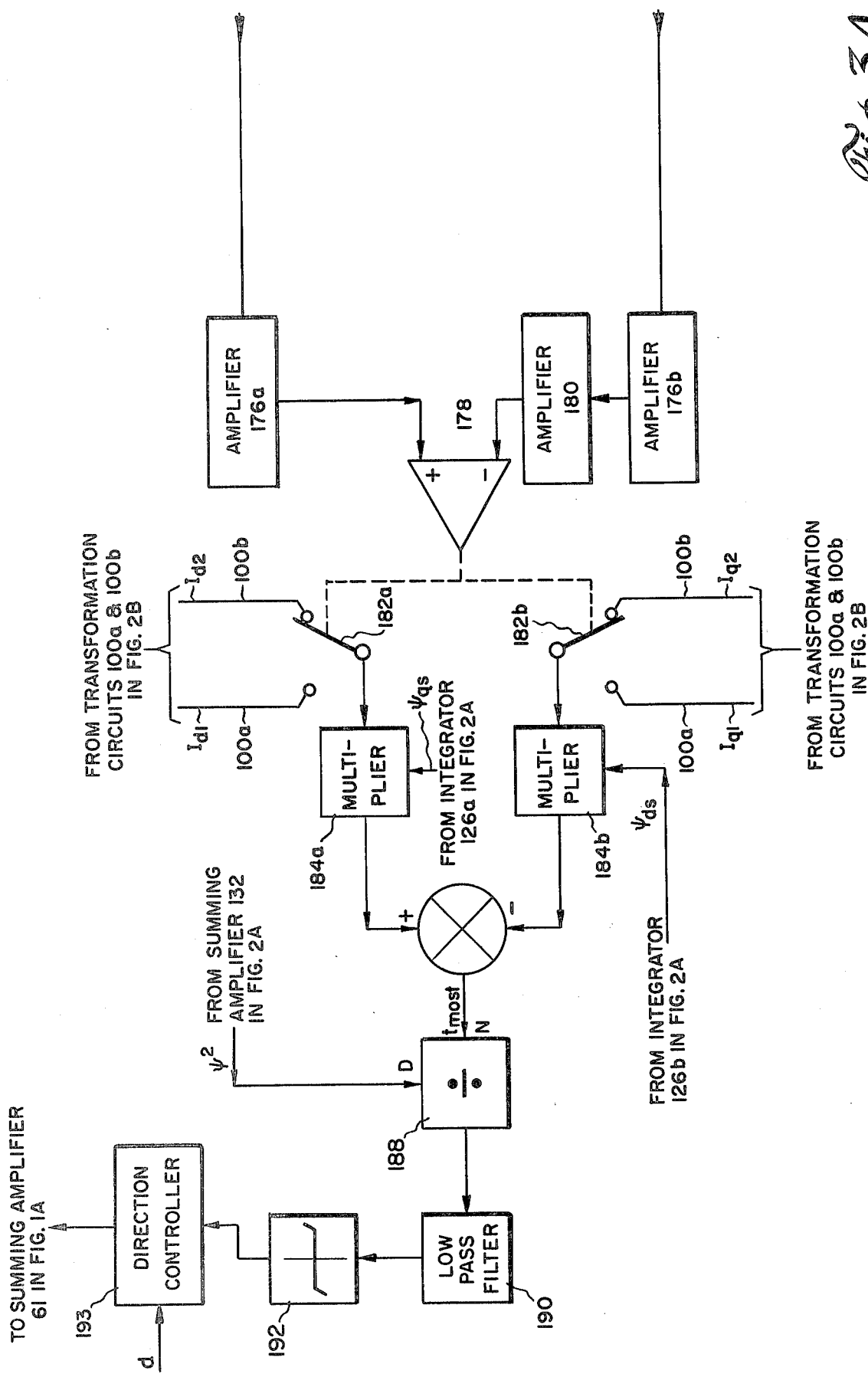
FIGS. 3A and 3B are a block diagram of the slip limit signal generator comprising a portion of the control apparatus of FIGS. 1A and 1B.
Figure 3B:
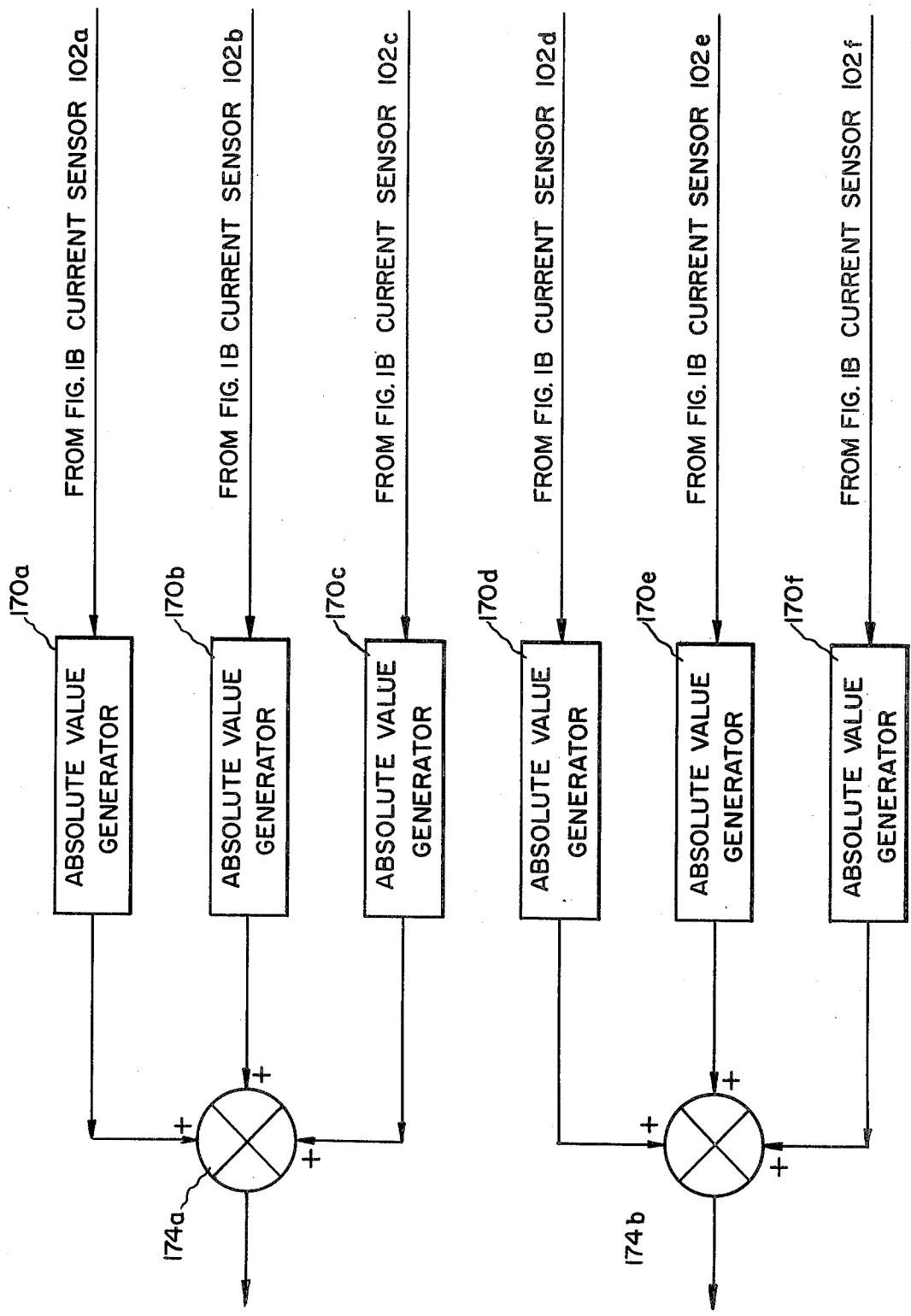

Slip-limit generator 68 which, as shown in FIGS. 1A and 1B, supplies control loop 28 with a signal proportional to the slip frequency of the most heavily loaded induction machine, is illustrated in block form in FIGS. 3A and 3B. Slip-limit signal generator 68 comprises six absolute value generators 170a through 170f, respectively, each absolute value generator producing an output signal varying in accordance with the absolute value of the input signal supplied thereto. Each of absolute value generators 170a, 170b and 170c, respectively, is supplied with the output signal of one of current sensors 102a, 102b and 102c, respectively, of FIGS. 1A and 1B, and provides an output signal varying in accordance with the absolute value of one of induction machine 12a stator current phase components $I_{a1}$, $I_{b1}$ and $I_{c1}$, respectively, to a separate one of the three inputs of summing amplifier 174a. Summing amplifier 174a supplies an output signal, varying in accordance with the sum of the magnitude of signals supplied to the three summing amplifier inputs, to an amplifier 176a which is coupled to a comparator 178. Amplifier 176a, typically having an attenuation factor of 0.5, attenuates the summing amplifier output signal supplied to the noninvert input of comparator 178 to prevent overloading of the comparator noninvert input.

Each of absolute value generators 170d, 170e and 170f, respectively, is supplied with the output signal from one of current sensors 102d, 102e and 102f, respectively, of FIG. 1 and each absolute value generator supplies an output signal, varying in accordance with the absolute value of a respective one of induction machine 12b stator current phase components $I_{a2}$, $I_{b2}$ and $I_{c2}$ to a separate one of the three inputs of summing amplifier 174b. Summing amplifier 174b supplies an output signal, varying in accordance with the sum of signals supplied to the three summing amplifier inputs, to an amplifier 176b which is coupled to the input of a second amplifier 180 whose output is coupled to the invert input of comparator 178. Amplifiers 176b and 180, typically having attenuation factors of 0.5 and 0.9, respectively, consecutively attenuate the summing amplifier output signal supplied to the invert comparator input to prevent overloading of the comparator invert input.

A first analog switch 182a, responsive to the output signal amplitude of comparator 178, couples the first input of a first multiplier 184a to the first output of one or the other of transformation circuits 100a and 100b, of FIG. 2. Depending on which of induction machines 12a and 12b of FIG. 1 draws more current which is indicative of which machine is more heavily loaded, the output signal amplitude of comparator 178 is either at a logical "one" or a logical "zero" level, respectively, causing switch 182a to couple the first output of one of transformation circuits 100a and 100b, respectively, to the first input of multiplier 184a. In this manner, multiplier 184a is supplied at its first input with a signal varying in accordance with the direct axis component of stator current drawn by the most heavily loaded one of machines 12a and 12b of FIG. 1. In like fashion, an analog switch 182b couples the first input of a second multiplier 184b to the output of one or the other of transformation circuits 100a and 100b in response to the output signal amplitude of comparator 178. Thus, multiplier 184b is supplied at its first input from one of transformation circuits 100a and 100b with a signal varying in accordance with the quadrature axis component of stator current drawn by the most heavily loaded induction machine.

Multiplier 184a is supplied at its second input from integrator 126a of FIGS. 2A and 2B with the signal $\psi_{qs}$, and produces an output signal varying in magnitude in accordance with the product of the magnitude of signals supplied to the first and second inputs of multiplier 184a. Multiplier 184b is supplied at its second input from integrator 126b of FIGS. 2A and 2B with the signal $\psi_{ds}$, and the multiplier produces an output signal varying in amplitude in accordance with the product of the magnitude of signals supplied to the first and second inputs of multiplier 184b.

A summing amplifier 186 is supplied at its noninvert and invert inputs with the output signals produced by multipliers 184a and 184b, respectively, and, in accordance with the difference between signals supplied to its noninvert and invert inputs, summing amplifier 186 produces an output signal $t_{most}$ varying in accordance with total torque produced by the most heavily loaded induction machine. The output signal produced by summing amplifier 186 is supplied to the numerator input N of a divider 188 whose denominator input D is coupled to the output of summing amplifier 132 of signal generator 32 shown in FIGS. 2A and 2B. Divider 188 produces an output signal proportional to the magnitude ratio of signals supplied to its numerator and denominator inputs. Thus output signal enumerator 188 varies in accordance with the ratio of $t_{most}/\psi^2 \psi^2$, where $t_{most}$ is the torque produced by the most heavily loaded induction machine and $\psi^2$ is the square of the average induction machine flux. As the ratio $T_{most}/\psi^2$ varies in accordance with the slip frequency of the most heavily loaded induction machine, it can be seen that the output signal of divider 188 similarly varies with the slip frequency of the most heavily loaded machine. The output signal produced by divider 188 is first filtered by a low pass filter 190 and limited by a limiter 192 before being supplied to a direction controller 193 configured essentially identically to direction controller 83 of FIG. 1. By filtering and limiting the input signal to direction controller 193, filter 190 and limiter 192 insure that the commanded machine slip does not exceed a predetermined maximum machine slip. Direction controller 193 is responsive both to direction signal d and the slip-limit signal produced by limiter 192 and reverses the polarity of the slip limit signal produced by the limiter when the two signals are of opposite polarity.

The foregoing describes an improved control apparatus for operating inverter-induction machine drive system comprised of a plurality of arbitrarily loaded induction machines from a conventional controlled current inverter. By regulating the inverter output current amplitude by feedback control in response to the average induction machine phase angle and by regulating inverter current frequency by feedback control in response to the average induction machine phase angle relationship magnitude and the slip frequency of the most heavily loaded induction machine, the control apparatus insures that the most heavily loaded induction machine has sufficient flux for a given load condition, thereby reducing the likelihood of machine pull-out and resultant inverter instability.

While certain preferred features of the invention have been shown by way of illustration, many modifications and changes will occur to those skilled in the art. For instance, although the invention has been described with respect to two induction machines, only minor changes would be necessary to readily adapt the invention for use with three or more induction machines without departing from the scope of the invention. It is, therefore, to be understood that the appended claims are intended to cover all such modifications and changes as fall within the true spirit of the invention.

What is claimed is:

1. For use with an inverter-induction machine drive system comprised of a direct current excited-inverter and a plurality of arbitrarily loaded induction machines, the machines coupled in parallel across the output of said inverter and each machine receiving variable amplitude, variable frequency alternating current from said inverter, an improved control apparatus for regulating inverter output current amplitude and frequency in response to operator commands, comprising:

circuit means coupled to said inverter and to each of said machines, said circuit means processing inverter output voltage and machine stator currents to produce a first signal varying in accordance with the average machine phase angle and a second signal varying in accordance with the slip frequency of the most heavily loaded one of said machines;

a first control loop coupled to said circuit means and said inverter, said first control loop being responsive to operator commands and regulating the amplitude of inverter output current by feedback control in response to the average machine phase angle relationship magnitudes; and a second control loop coupled to said circuit means and said inverter, said second control loop being responsive to operator commands and regulating the frequency of inverter output current by feedback control in response to the average machine phase angle and the slip frequency of the most heavily loaded one of said induction machines to assure that the most heavily loaded one of said induction machines has sufficient flux, to remain synchronized to said inverter thereby reducing the liklihood of machine pull-out and inverter instability.

2. The invention according to claim 1 wherein said circuit means comprises:

a first signal generator coupled to each of said plurality of induction machines and to said inverter for generating, from machine stator current and inverter output voltage a first signal varying in accordance with the average machine phase angle and a second signal varying in accordance with the average machine stator flux and a third and fourth signals varying in accordance with the direct and quadrature axes components, respectively of the average machine stator flux; and a second signal generator coupled to each of said plurality of induction machines and to said first signal generator, said second signal generator processing said second, said third, and said fourth signals produced by said first signal generator to produce an output signal varying in accordance with the slip frequency of the most heavily loaded one of said plurality of induction machines.

3. The invention according to claim 1 wherein said first control loop comprises:

a first inner loop coupled to said circuit means, said first inner loop producing an output signal proportional in magnitude to desired inverter current in accordance with the average machine phase angle; and a second inner loop coupled to said first inner loop and to said inverter, said second inner loop regulating inverter output current amplitude responsive to the difference in magnitude between desired inverter current and actual inverter current.

4. The invention according to claim 3 wherein said first inner loop comprises:

a first limiter coupled to said circuit means for limiting said first circuit means output signal to produce an output signal, proportional in magnitude to the average machine stator flux;

a summing amplifier having a first and a second input and an output, said summing amplifier coupled at said first input to the output of said first limiter and supplied at said second input with a signal varying in accordance with the actual average machine stator flux; said summing amplifier producing a flux error signal at said output in accordance with the difference in magnitude between input signals supplied to said first and second summing amplifier inputs;

a low pass filter having an input and an output and coupled at its input to said summing amplifier for filtering said flux error signal; and a second limiter having an input and output and coupled at its input to said output of said low pass filter for providing an output signal representative of the desired magnitude of inverter current, in accordance with said low pass filter output signal.

5. The invention according to claim 3 wherein said second inner loop comprises:

a first summing amplifier having a first input coupled to the output of said first inner loop, a second input adapted to be supplied with a signal varying in accordance with an operator-commanded minimum inverter current, and a third input coupled to said inverter so as to be supplied therefrom with a signal varying in accordance with actual inverter link current, said first summing amplifier producing an output signal proportional in magnitude to the sum of the signal magnitudes supplied to said first and second summing amplifier inputs less the magnitude of signal supplied to said third summing amplifier input;

means coupled to said first summing amplifier for producing a voltage command signal in accordance with said first summing amplifier output signal; and a second summing amplifier having a first and a second input, said second summing amplifier coupled at its first input said means for producing a voltage command signal and coupled at its second input to said inverter so as to be supplied therefrom with a signal varying in accordance with inverter input voltage, and second summing amplifier regulating the amplitude of inverter current in accordance with the sum of the magnitude of signals supplied to said first and second summing amplifier inputs.

6. The invention according to claim 5 wherein said means for producing a voltage command signal comprises:

a high gain amplifier coupled to said first summing amplifier for scaling said first summing amplifier output signal to produce said voltage command signal; and a limiter coupled to said high gain amplifier for amplitude limiting said voltage command signal.

7. The invention according to claim 1 wherein said second control loop comprises:

a first inner loop adapted to be supplied with a signal proportional in magnitude to an operator-commanded inverter output frequency, said first inner loop being coupled to said inverter so as to be supplied with actual inverter frequency command signals, said first inner loop producing an angle error signal varying in accordance with the difference in magnitude between the operator-commanded and the actual inverter frequency;

a second inner loop having a first input coupled to said first inner loop and a second and third input coupled to said circuit means to receive said first and second signals, respectively, produced by said circuit means, said second inner loop producing a machine phase angle command signal in accordance with the difference in magnitude between said first inner loop angle error signal and the combined magnitude of said first and second signals produced by said circuit means; and a third inner loop coupled to said second inner loop and to said inverter for regulating inverter output frequency in accordance with said machine phase angle command signal produced by said second inner loop.

8. The invention according to claim 7 wherein said first inner loop comprises:

a summing amplifier having a first input adapted to be supplied with said signal proportional to an operator-commanded inverter output frequency and having a second input coupled to the output of said third inner loop, said summing amplifier providing an output signal in accordance with the difference in magnitude between signals supplied to the first and second summing amplifier inputs; and a limiter having an input coupled to the output of said summing amplifier for producing said angle error signal in accordance with said summing amplifier output signal.

9. The invention according to claim 7 wherein said second inner loop comprises:

a first adjustable gain amplifier coupled at its input to said first inner loop for amplifying said angle error signal in accordance with inverter output frequency;

a summing amplifier having first, second and third inputs, said first and said second summing amplifier inputs coupled to said circuit means and said third summing amplifier input coupled to said first adjustable gain amplifier, said summing amplifier producing an output signal in accordance with the magnitude of said adjustable gain amplifier output signal less the combined magnitudes of said first and second signals produced by said circuit means; and a second adjustable gain amplifier for amplifying said summing amplifier output signal in accordance with the magnitude of the inverter output frequency to produce said machine phase angle command signal.

10. The invention according to claim 7 wherein said third inner loop comprises:

a fixed gain amplifier coupled to the output of said second inner loop for producing an output signal in accordance with said machine phase angle command signal;

a summing amplifier having first and second inputs and an output;

a first limiter coupled between the output of said fixed gain amplifier and said first input of said summing amplifier for limiting the amplitude of said fixed gain amplifier output signal;

an integrator coupled between the second input of said summing amplifier and the output of said second inner loop for integrating said machine phase angle command signal; said summing amplifier producing said actual inverter frequency command signal in accordance with magnitude of the sum of the signals supplied to said first and second summing amplifier input; and a second limiter having an input coupled to the output of said summing amplifier for limiting said inverter frequency actual command signal.

11. The invention according to claim 10 further including a direction controller coupled between said limiter and said inverter, said direction controller being responsive to both the actual and desired direction of rotation of said machines and adjusting polarity of said actual inverter frequency command signal when the actual direction of rotation differs from the desired direction of rotation.

12. For use with an inverter induction machine drive system comprised of a direct current energized inverter and a plurality of arbitrarily loaded induction machines coupled in parallel across the output of said inverter and supplied from said inverter with variable amplitude, variable frequency alternating current, a method for regulating the amplitude and frequency of current supplied by said inverter to assure that the most heavily loaded one of said induction machines had sufficient flux, thereby reducing the liklihood of machine pull-out and inverter instability, said method comprising the steps of:

processing inverter output voltage and stator currents supplied to each of said machines to produce a first signal varying in accordance with the average phase angle and a second signal varying in accordance with the slip frequency of the most heavily loaded one of said induction machines;

adjusting the inverter output current amplitude by feedback control in response to said first signal; and adjusting the inverter output current frequency by feedback control in response to said first and second signals.

13. The method according to claim 12 wherein said step of adjusting inverter output current amplitude by feedback control in response to said first signal comprises the steps of:

limiting the amplitude of said first signal to produce a signal varying in accordance with desired machine air gap flux;

comparing said signal varying in accordance with desired air gap flux with a signal varying in accordance with actual machine air gap flux and producing a flux error signal in accordance with the difference in magnitude therebetween;

filtering and limiting said flux error signal to produce a signal varying in accordance with the desired inverter output current amplitude;

algabraically combining said signal varying in accordance with the desired inverter current amplitude with a signal proportional to actual inverter current and a signal varying in accordance with an operator-commanded minimum inverter output current amplitude to produce a voltage command signal varying in accordance with desired inverter output voltage;

combining said voltage command signal with a signal varying in accordance with actual inverter voltage to produce a voltage control signal; and varying the inverter output current amplitude in accordance with said voltage control signal.

14. The method according to claim 12 wherein said step of adjusting inverter output current frequency by feedback control in response to said first and second signals comprises the steps of:

comparing actual inverter frequency to an operator-commanded inverter frequency and producing a frequency error signal in accordance with the difference in magnitude therebetween;

limiting and scaling said frequency error signal to produce a machine phase angle command signal varying in magnitude with the desired average machine phase angle;

algabraically combining said machine phase command signal with said first and second signals to produce an intermediate phase angle command signal proportional to the difference in magnitude between the desired average machine phase angle and the actual average machine phase angle;

integrating and scaling said intermediate phase command signal to limit the rate of increase thereof;

limiting said intermediate phase command signal to produce an inverter phase command signal having a predetermined lower limit;

producing an inverter frequency control signal whose magnitude varies directly with said inverter phase command signal and whose polarity varies in accordance with the difference in polarity between said inverter phase command signal and an operator varied direction signal; and adjusting the inverter output current frequency in accordance with said inverter frequency control signal.

* * * * *